United States Patent Office 3,232,287
Patented Feb. 1, 1966

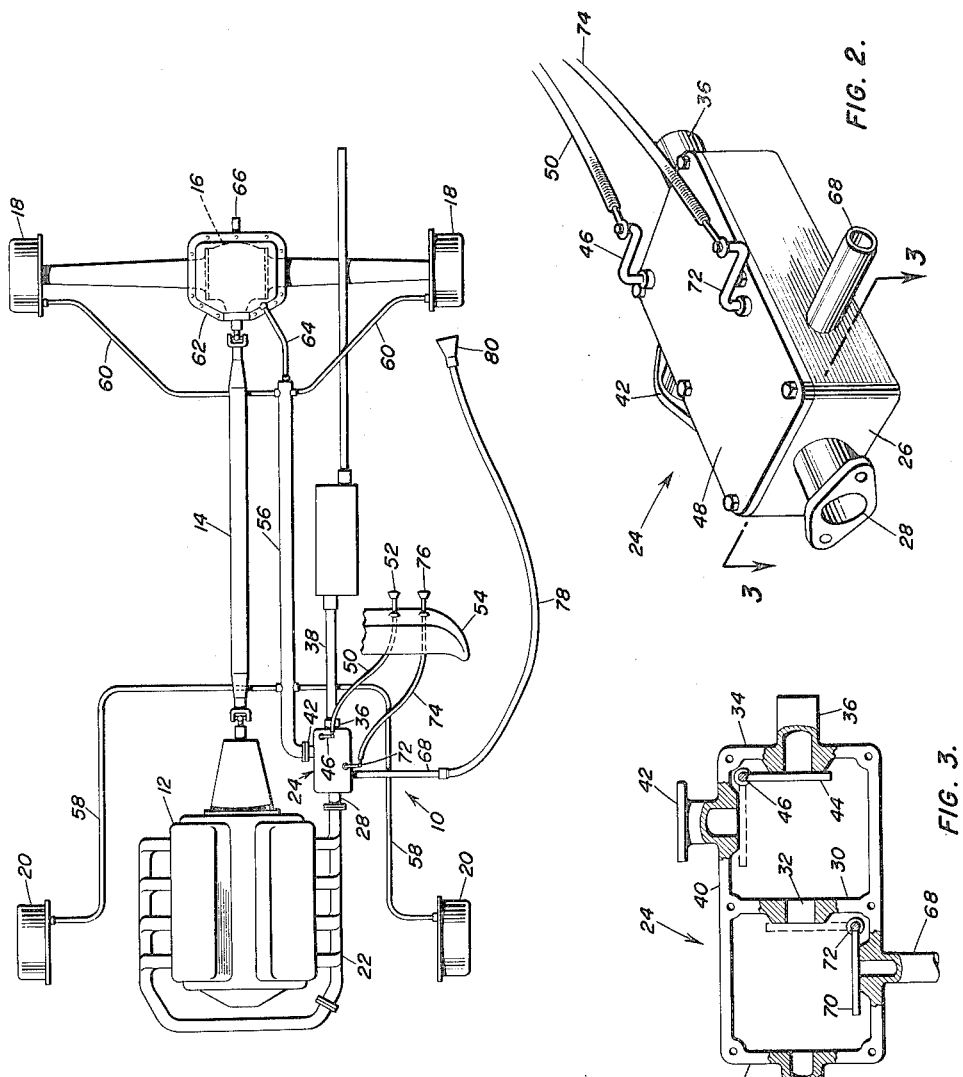

3,232,287
AUTOMOBILE DEFREEZER UNIT
Lee Harwood Gillingham, 3906 Old York Road, and William C. Grau, Sr., 3916 Old York Road, both of Baltimore, Md.
Filed Dec. 24, 1963, Ser. No. 333,031
7 Claims. (Cl. 126—271.1)

This invention relates generally to automotive type heating devices, and more particularly it pertains to a heating system for selectively defrosting critical areas of automotive type devices.

It is an object of this invention to provide an arrangement for utilizing the waste heat of an automobile engine to rapidly and selectively warm up certain critical zones of an automotive type mechanism and thereby reduce wear and possible damage in cold weather operation.

Another object of this invention is to provide a brake defroster for gas engine type vehicles.

Still another object of this invention is to provide a system for zone heating directly by exhaust gas which can be readily attached to existing vehicles.

To provide an ice melter to free the frozen wheels of a parked car, is yet another object of the invention.

Other objects and attendant advantages of this invention will become more readily apparent and understood from the following detailed specification and single sheet of accompanying drawings in which:

FIG. 1 is a schematic of a zone heating system for an automobile which incorporates features of this invention;

FIG. 2 is a perspective view of the exhaust distributor for the system of FIG. 1; and FIG. 3 is a horizontal section taken at 3—3 of FIG. 2.

Referring now to the details of the drawings, as shown in FIG. 1 the critical zones to be protected from freezing conditions in the example are the brakes and the differential. Of course the system of this invention can be applied to other mechanisms and parts such as the transmission gear box, steering mechanism, battery, etc., once the general principle of this invention is understood.

The system of this invention, designated generally by reference numeral 10, is practiced by directly utilizing the exhaust gas from an automobile engine 12. This is done by disconnecting the exhaust manifold 22 from the exhaust pipe 38 and serially inserting therebetween an exhaust distributor 24.

As best shown in FIGS. 2 and 3, the exhaust distributor 24 consists of a cast metal box having a bolted-on cover plate 48. The engine manifold 22 is attached to an inlet 28 on the front wall 26, with the exhaust pipe 38 being attached to an exhaust nipple 36 on the rear wall 34. The exhaust distributor 24 is further provided with an outlet 42 on a side wall 40 and this outlet 42 is connected to a manifold pipe 56 which may be installed on the vehicle parallel to its drive shaft 14.

A pair of flexible conduit lines 58 are routed from the manifold pipe 56 and are attached to the sides of the front brake drums 20. Similarly a pair of lines 60 connect the manifold pipe 56 to the rear brake drums 18.

A jacket or glove 62 is bolted together about the differential housing 16 of the vehicle, totally enclosing it except for an exhaust aperture or vent 66. An exhaust conduit or heat line 64 joins glove 62 to the end of the manifold pipe 56.

A control knob 52 is mounted on the dash panel 54 of the vehicle, which a flexible cable 50 of the choke type leads therefrom to a crank 46 on the coverplate 48 of the exhaust distributor 24. The crank 46 provides pivoting for an inner gate 44 which can thusly be selectively swung from closing the exhaust nipple 36 or closing the outlet 42.

With the exhaust nipple 36 closed (as shown), the hot exhaust gases from the engine 12 are routed through the manifold pipe 56, through lines 58 and 60 and then escape around the brake mechanism in the drums 20 to the atmosphere. The line 64 conducts the hot gas in like fashion to the interior of glove 62 to heat the differential 16 before escaping through vent 66.

Another control knob 76 and cable 74 are provided to work a second crank 72 on the exhaust distributor 24. This crank 72 pivots a gate 70 which swings to selectively uncover an outlet pipe 68 and to cover a port or passage 32 in a center wall 30 which extends across the inside of the distributor 24.

This outlet pipe 68 is attached to a flexible removable hose 78 having a nozzle 80. The hose 78 is of such length as to readily reach exteriorly to all wheels of the vehicle. Hot exhaust gas can by this means be manually directed to melt the ice or snow around the wheel to free it and to improve traction to the ground.

It should be noted that with the direct application of hot exhaust gas to the various parts is a significant improvement over any prior art employing indirect means, such as heated radiator water or air for there is no delay in heat transfer. Hot exhaust gas is available the instant an engine starts, whereas water or air requires several minutes of warm-up during which time damage may be incurred to frozen mechanisms if the vehicle is driven.

Obviously many modifications and variations of the present invention are possible in light of the above teachings. It is, therefore, to be understood that within the scope of the appended claims the invention may be practiced otherwise than as specifically described.

What is claimed is:

1. In combination with a motor vehicle having an exhaust pipe, a heating system for defrosting areas of said motor vehicle comprising, structure defining first and second chambers having a passage communicating therebetween, said first chamber having an inlet for receiving the exhaust gases of said motor vehicle, with said exhaust pipe thereof being in communication with said second chamber, first and second conduits connecting said first and second chambers, respectively, with said areas of said motor vehicle, and first and second valve means selectively passing said exhaust gases between said first conduit and said passage and between said second conduit and said exhaust pipe, respectively.

2. The heating system as recited in claim 1, wherein control means are provided for said first and second valve means, said control means including a pair of knobs having flexible cables connected, one each, to said first and second valve means.

3. In combination with a motor vehicle having an exhaust pipe, a heating system for defrosting areas of said motor vehicle, comprising first and second passage means communicating with said areas of said motor vehicle, mechanism having an inlet for receiving the exhaust gases of said motor vehicles, an outlet communicating with said exhaust pipe, an intermediate opening communicating between said inlet and said outlet, and an inlet for each said passage means, a first valving mechanism for alternately closing said opening and one said inlet for said passage means and a second valving mechanism for alternately closing said outlet and the other said inlet for said passage means.

4. In combination with a motor vehicle having an exhaust pipe, differential housing and brake drums, a heating system for defrosting areas of said motor vehicle including the differential housing and brake drums, comprising first passage means communicating with the differential housing and the brake drums of said motor vehicle, second passage means of flexible tubing and having one end free for communicating with other of said areas of said motor vehicle, and means selectively passing the exhaust gases of said motor vehicle between said first passage means, said second passage means, and said exhaust pipe of said motor vehicle.

5. The heating system as recited in claim 4, wherein said selective passing means includes a distributing housing having an inlet for said exhaust gases, an outlet communicating with said exhaust pipe, an intermediate opening communicating between said inlet and said outlet, and an inlet for each of said passage means, a first valving mechanism for alternately closing said opening and one said inlet for said passage means and a second valving mechanism for alternately closing said outlet and the other said inlet for said passage means.

6. The heating system as recited in claim 4, wherein means enclosing the differential housing of said motor vehicle are provided, and said first passage means communicates said exhaust gases with said enclosing means.

7. The heating system as recited in claim 4, wherein said first passage means includes a manifold tube and separate passages branched therefrom and communicating with said differential housing and said brake drums.

References Cited by the Examiner
UNITED STATES PATENTS

| | | |
|---|---|---|
| 1,143,395 | 6/1915 | Hole. |
| 2,325,901 | 8/1943 | Atkinson. |
| 2,526,923 | 10/1950 | Alessandro _____ 237—12.3 X |
| 2,677,563 | 5/1954 | Weiner. |
| 3,151,613 | 10/1964 | Howard _____ 126—271.1 |

FREDERICK L. MATTESON, Jr., *Primary Examiner.*

CHARLES J. MYHRE, *Examiner.*